United States Patent [19]
Bower

[11] 3,999,486
[45] Dec. 28, 1976

[54] BALLISTICS AND HIGH PRESSURE SEALS

[76] Inventor: Bernal L. Bower, 2972 Pemba Drive, Costa Mesta, Calif. 92626

[22] Filed: Jan. 8, 1975

[21] Appl. No.: 539,456

Related U.S. Application Data

[60] Continuation of Ser. No. 355,480, April 30, 1973, abandoned, which is a continuation of Ser. No. 789,736, Jan. 8, 1969, abandoned, which is a division of Ser. No. 654,301, June 22, 1967, Pat. No. 3,520,268.

[52] U.S. Cl. .................................. 102/93; 102/92
[51] Int. Cl.[2] .................................. F42B 31/02
[58] Field of Search .............................. 102/93, 92

[56] References Cited

UNITED STATES PATENTS

| 1,455,354 | 5/1923 | Porter | 102/93 |
| 2,133,761 | 10/1938 | Tietig | 102/92 |
| 2,313,402 | 3/1943 | Turechek | 102/93 |
| 2,360,473 | 10/1944 | Calkins | 102/93 |
| 2,398,895 | 4/1946 | Schreib | 102/93 |
| 2,411,073 | 11/1946 | Whitney | 102/93 |
| 2,689,380 | 9/1954 | Tait | 102/93 |
| 2,856,856 | 10/1958 | Michael | 102/93 |
| 2,928,348 | 3/1960 | Zisman et al. | 102/93 |

FOREIGN PATENTS OR APPLICATIONS

| 350,575 | 1/1961 | Switzerland | 102/93 |
| 465,392 | 5/1937 | United Kingdom | 102/92 |
| 526,941 | 9/1940 | United Kingdom | 102/93 |

*Primary Examiner*—Charles T. Jordan

[57] ABSTRACT

This invention discloses a new type of seal for providing a barrier to the flow of high temperature gas at ballistics pressures, and having ordnance application and other application where it is desired to seal against the leakage of high temperature, high pressure gas or other working fluid beyond either a working or static obturator.

12 Claims, 4 Drawing Figures

INVENTOR
Bernal L. Bower

BALLISTICS AND HIGH PRESSURE SEALS

DISCLOSURE

This application is a continuing application of a copending intermediate application filed Apr. 30, 1973, Ser. No. 355,480 carrying the same above title, which application was a continuing application of a copending intermediate application filed Jan. 8, 1969, Ser. No. 789,736 carrying the same above title, both application now abandoned. The application Ser. No. 789,736 was a division of the parent application filed June 22, 1967, Ser. No. 654,301 which issued July 14, 1970 as U.S. Pat. No. 3,520,268, and entitled Ballistics Embedment Anchors.

This invention relates to seals used in preventing leakage of a working fluid and more particularly to ballistics seals for use in ordnance weapons and other ballistics devices and in applications where sealing against leakage of high pressure, high temperature gas is required.

The objects of this invention are: (1) To provide a means for obturating high temperature gas at ballistics pressures in devices which utilize propellant grains and the like for propulsion of these devices. (2) To provide a protesting means in conventional type seals against high temperatures which would otherwise be damaging to these seals. (3) To provide a ballistics seal which will more perfectly seal against the leakage of high temperature, high pressure gas than will the seals commonly used in this application. (4) To provide an ordnance seal which may be incorporated by manufacture into the projectile itself for use in artillery pieces, small and large fire arms ammunitions and the like for increasing the useful life, muzzle velocity and accuracy of these weapons. (5) To provide a working seal for applications in secondary mechanisms of ordnance machinery in which a portion of the propellant gas is used to drive the mechanism.

In the drawing FIG. 1 shows in section schematically a portion of the anchor device which is the subject of the parent application.

In the present state of the art there is available an abundant variety of sealing structures, sealants, and gasket materials capable of providing adaquate sealing of gases and liquids in both static and dynamic sealing applications below operating temperatures of 600° F and working pressures of 500 psi. Whereas, some special purpose structures have been devised to resist temperatures as high as 1500° F, and in some cases pressures as high as 10,000 psi, for the most part these have been static seals. Propellant gases in ballistics devices may exist at temperatures as high as 6000° F and pressures in the order of 50,000 psi. Common sealing materials will extrude at these temperatures and pressures, and metals will oxidize and lose their strength at temperatures in this range.

Fortunately, the duty cycle period of most ballistics devices is short compared with the off duty period so that temperatures in the device structure never attain to the temperture of the propellant gases. Propellant gas pressures act for short periods only. Acceleration of the parts is great and the dynamic response of the working seals becomes important in these devices.

Devices in which much leakage at ballistics pressures cannot be permitted must therefore employ ring seals of metal or plastics materials. Seal structure clearances must be kept small in order to prevent extrusion of the plastics materials comprising these rings or the overloading of light metal rings. The direct application of the propellant gases to the surfaces of the ring material must not be permitted because the high temperature of these gases would damage the ring. Of course, seal structure cooling must be provided in ballistics devices in which the device structure does not provide an adequate heat sink for reducing seal structure temperatures to a safe limit.

Figure 1:
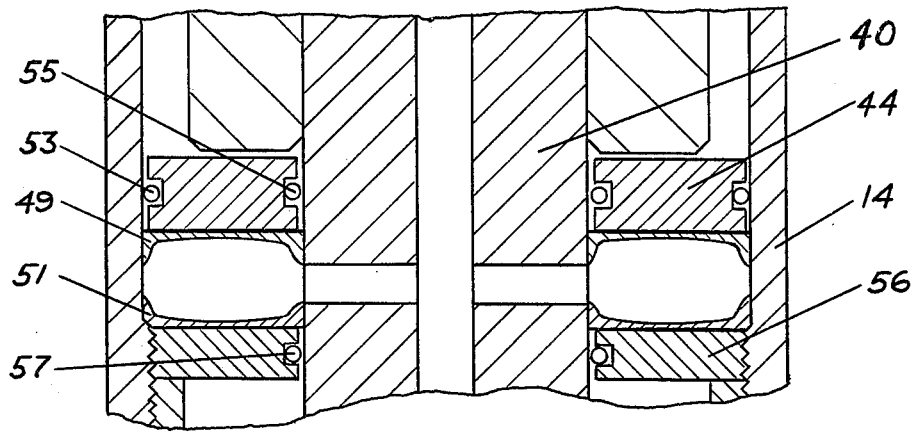
FIG. 1 shows embodiments of the seal including working and static obturating membeers as well as its use with conventional ring seals and gaskets.

In the invention of the parent application, FIG. 1, a shoe 49, 51, made of sintered metal or other porous material capable of withstanding high temperatures, impregnated with a high temperature colloidal graphite lubricant dispersed in a noncombustible vehicle sealant having moderate viscosity at high temperatures acts as a buffer seal and heat barrier for the 0-ring seal 53, 55, 57. The channel flanges of the shoe 49, 51 are made a close fit to the surface of the secondary propulsion chamber walls 14, 40, and may be tapered to a relatively thin edge. The shoe flanges are made a slight interference fit to the walls of the secondary propulsion chamber and are deflected to permit the assembly of the shoe in the chamber. The 0-ring is made of some suitable high temperature resistant relatively hard plastics material such as Teflon or it may be a metal ring if required. All free volume between the 0-ring and the shoe is packed with the graphite sealand-lubricant. Upon application of the high temperature, high pressure gases to the seal the graphite sealant-lubricant becomes fluid and lubricates the sliding surfaces, and acts as a heat barrier between the hot gases and the 0-ring. The 0-ring forms a joint to be sealed of minimal clearance between the secondary propulsion chamber walls 14, 40, and ring piston 44, or obturator head 56. Because of the structural configuration of the porous material of shoe 49, 51, and its close fit to the surface of the secondary propulsion chamber walls, and its position interposed between the hot, high pressure gases and the joint to be sealed comprising the interactives between the nonporous contiguous members including the 0-ring 53, 55, 57, and the walls of the above adjacent structures, the action of the gases upon the seal is to force, or extrude the sealand-lubricant from the pores of the shoe 49, 51, and from the free volume containing the sealant-lubricant into the joint under high static fluid pressure, filling the clearance of the joint and thus sealing the joint, and lubricating the working surfaces of the sliding parts. Because of the combination in my invention of the noncombustible sealant material acting as the transporting vehicle for the lubricant, and the colloidal graphite dispersion in this vehicle acting as the lubricant both pressure sealing of the joint and lubrication by force feed of the working parts thereof are effected. The sealant materials may therefore be chosen without regard to its qualities as a lubricant, and only its viscosity, viscosity index, stability at high working temperatures, or other such properties which might affect its use as a sealant need be considered.

Shoe 49, 51 may be brazed or welded to ring piston 44 and anchor head structure 56, respectively. It will be noted that in the anchor device heat transfered from the propellant gases into the sintered metal structure of the seal is conducted away from this seal structure and into the heavy portions of the anchor structure where the temperature rise will be moderate, and the seal structure will not attain to propellant gas temperatures. The O-ring therefore acts effectively as a seal or barrier to the leakage of a viscous liquid at moderate temperatures rather than as a seal against leakage of a gas at high temperatures, and is protected for the direct application of the hot gases. Thus the ring seals are spared the damaging temperatures of the propellant gases. The supperiority of both pressure sealing of the joint to be sealed with a viscous sealant material and lubrication of the working parts of the seal by force feed lubrication over present sealing methods in devices which must contain and work by propellant gases is evident.

In another embodiment of the invention as used in the anchor of the parent application, FIG. 1, the seal is utilized as a barrier against leakage of high temperature, high pressure gas beyond a static obturator. During the ballistics phase of anchor penetration the seal consisting of anchor head structure 56, 0-ring 57, and the immpregnated porous shoe 51 acts as a static seal and gas-tight head. In this application the joint to be sealed is the minimal space between the adjacent surfaces of the nonporous contiguous members comprising the reciprocating inertial reactor shaft 40, the O-ring gasket 57, and the head structure 56. The reciprocating inertial reactor shaft 40, the anchor casing 14, and the shoes 49, 51 form an annular chamber or cavity which contains the propellant gases. The anchor head structure 56 is the static obturator, and the ring piston 44 is the working obturator. The action of the gases upon the static seal to seal the static joint is exactly as stated above, the only difference being that in the case of the static embodiment there is no relative motion between the parts making up the joint to be sealed.

Figure 3:
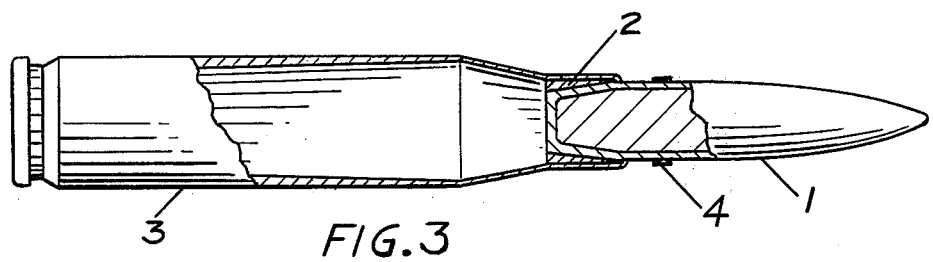
FIG. 3 is a drawing partly in section of a small arms cartridge employing a jacketed bullet and illustrates an application of the ballistics seal to this type of ammunition.

It is expected that this new type of working seal will find wide application in primary and secondary mechanisms of many kinds of ordnance weapons and ordnance machinery. For example, the porous seal structure either with or without the ring portion may be used in ammunition for both light and heavy rifles and other field pieces where gas leakage under ballistics pressures and temperatures results in loss of thermodynamic efficiency and excessive erosion and wear of surfaces. This seal structure would operate in the bore of a rifle to seal off gas flow past the projectile and to lubricate the rifle bore by force feed lubrication with every shot. In this application a portion or all of the base of the projectile 1 is made of a sealant-lubricant impregnated sintered metal material such as sintered iron or copper or a soft alloy of copper. This structure being porous and very ductile would compress easily on entering the bore of the rifle and be conformed to as it is mated with the cross sectional configuration of the rifling of the rifle bore. The diameter of the sintered metal base seal 2, FIG. 3, is made slightly larger than the diameter of the bore of the rifle. This sintered metal structure being highly porous and ductile would compress easily on entry into the rifle bore and not produce much resistance to engraving by the rifling lands. The projectile 1 if it is the type employing a gilding metal jacket, or an associated ring 4 of the nonporous ductile metal type used as conventional rotating bands, is engraved by the lands of the rifle bore and thus is conformed to the cross sectional configuration of the rifling and mated with the rifle bore. The interstice or minimal space between the portion of the projectile engraved by the rifling, or the surface of the ring engraved by the rifling, and the working surface of the rifle bore constitutes a close fit sliding joint to be sealed and lubricated. The joint to be sealed is thus made up of mated nonporous contiguous structures or members closely fit together to form a region or joint of minimal space into which the sealant-lubricant is forced and which constitutes a barrier to the gross leakage of the sealand-lubricant material therefrom. As disclosed below, in the prefered embodiment the ring 4 is omitted, or if used is made of a porous material like the base seal 2. The mechanism of the action of the gases at ballistics temperatures and pressures on the sealant-lubricant impregnated sintered metal base of the projectile is to heat, liquify and extrude the sealant-lubricant from the pores of the base seal 2 and force it into the minimal space of the joint to be sealed. The presence of the sealant-lubricant under pressure in the joint lubricates the sliding surfaces of the contiguous members of the joint, and seals the joint so that the seal in total presents a gas-tight barrier to the leakage of the propellant gases past the projectile. The projectile thus literally slides on a thin film of the liquified sealant-lubricant, and the total seal provides an effective barrier to the flow of gases past the projectile throughout its duty life, that is, throughout its travel down the bore of the rifle to the muzzle. In addition, the entire working surface of the bore throughout its length is lubricated by force feed with each shot, greatly increasing the useful life, muzzle velocity and accuracy of the rifle.

Figure 2:
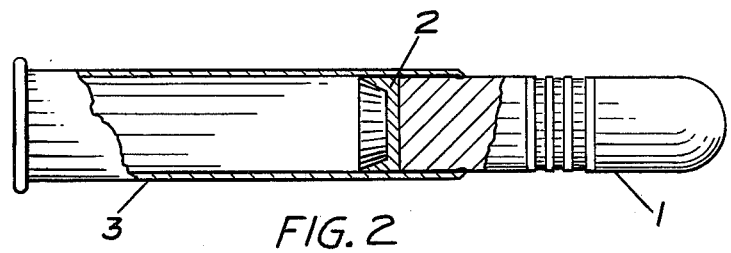
FIG. 2 is a drawing partly in section of a small arms cartridge showing a possible use of the ballistics seal for small arms ammunition.

FIG. 2 shows the application of the seal in small arms ammunition. The bullet 1 is a soft ductile metal such as a lead alloy which readily deforms, or it may be a steel bullet jacketed with gilding metal so that the peripheral jacket of the bullet readily deforms. The seal 2 may be a sintered lead alloy extension of the base of the bullet having high porosity, cup shaped with the impregnated sealant-lubricant dispersed throughout the porous structure. When the rifle is fired the propellant gases at ballistics pressures and temperatures act to force the bullet out of the cartridge case 3 and into the bore of the rifle, and thereafter to propel it the length of the rifle barrel. As the bullet leaves the cartridge case and enters the rifle bore it is engraved by the rifling of the bore. This action forces the bullet to conform to the shape of the cross section of the rifle bore and forms the close sliding joint to be sealed between the sliding surface of the bullet and the working surface of the rifle bore. The bullet becomes effectively a moving or dynamic obturator to the propellant gases which would partly escape past the bullet through the clearance of the sliding joint if it were not sealed. The peripheral flange of the cup shaped base seal expands or blows out under the action of the high pressure propellant gases to conform to the cross sectional configuration of the rifle bore. Under the action of the high pressure, high temperature propellant gases the impregnated sealant in the base seal structure is heated, liquified and extruded from the pores of this structure into the clearance of the sliding joint. Any change in clearance between the bullet and the rifle bore as the bullet progresses the length of the barrel due to uneven wear or imperfections in the rifling will automatically be sealed by the presence of the sealant under pressure in these clearances, the relatively slow leakage of the viscous liquid sealant sealing aganst the rapid leakage of the propellant gases which would otherwise occur.

Figure 4:
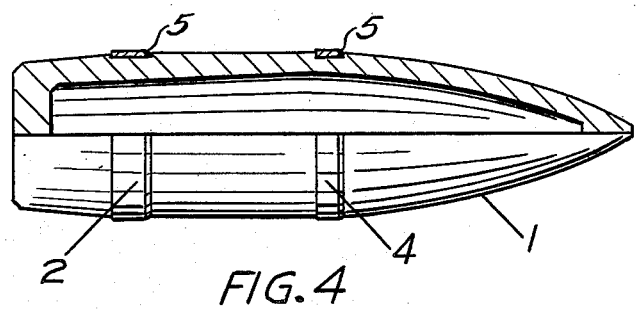
FIG. 4 is a drawing partly in section of a ballistics projectile and shows how the ballistics seal may be used with the projectiles of larger field rifles.

The porous seal structure may be used without the ring. That is, it may be used alone to provide good sealing against leakage of gas beyond it in a cavity if the exposed surface of the porous structure facing way from the gas, that is, the exposed surface facing the low pressure side indicated by 5 in FIG. 4 is either solid or has its voids closed or sealed as by soldering or the like. The action of the high temperature, high pressure gas against the high pressure side of the seal would then be to liquify and extrude the sealant-lubricant into the clearance between the sliding surface of the seal structure and the working surface of the cavity wall because outflow of the sealant would be prevented from its exposed surface on the low pressure side by closure of its means of exit from that side of the seal structure. Applications involving use of the seal structure along without the ring are included among the following.

FIG. 3 shows the application of the seal to small arms ammunition in which the bullet is of the caliber .30, or .50 and larger types. In this application the tapered ring-shaped base seal 2 may be made somewhat larger in diameter than the diameter of the bullet, and may encircle the base of the bullet at the boat tail as shown. The soft seal material covering the boat tail base of the armor piercing types would strip away easily as the bullet entered and passed through the target material and it would offer considerable damping against the possible shattering of the hard core material in the base of the bullet. The base seal may be used alone or with the ring 4 which could be the rotating band of the larger projectiles as in FIG. 4. Ring 4, FIGS. 3 and 4, may also be made of an impregnated sintered material like the base seal having the voids in its forward face 5 closed or sealed as described above.

FIG. 4 shows the base seal 2 as a portion only of the base of the projectile 1. The ring 4 may replace the bourrelet of the larger projectiles and be made of the same impregnated sintered metal material as seal 2, or it may be found desirable to employ different materials for these two seal components. In the application shown in FIG. 4 both the seal 2 and the ring 4 may be employed as rotating bands if the rifling is of uniform twist. The danger of stripping the base seal is thus reduced by distributing the same shearing load between the two bands. The difficulty of manufacture of the increasing twist system of rifling is thus circumvented by obviating its requirement. Replacing the bourrelt with the ductile sintered metal ring eliminates the rigid metal to metal contact at high dynamic unit loads of the projectile and the inner surface of the lands of the rifle bore which is so destructive to the lands. The very ductile sintered metal ring would compress easily so as to conform to the cross sectional configuration of the rifle bore and thus distribute the same dynamic and static loads over the entire peripheral contact area of the rifle bore reducing the unit loading substantially. Making both the base seal andd the bourrelet ring of the impregnated sintered metal material having the voids in their forward faces sealed as described above would provide lubrication for the total sliding contact surface of the projectile and a double seal against leakage of the propellant gases and would reduce the loading on both the rifling and the seals.

The seal may also find wide application in secondary mechanisms of ordnance machinery such as the mechanisms of automatic weapons in which a portion of the propellant gases is used to drive the reloader mechanism. In applications involving the continuous use of the seal structure the impregnated porous member would require periodic replacement because of the eventual loss of the sealant-lubricant through leakage past the ring seal. Thus the impregnated porous member may be fastened to the obturating member by screw or other quick release tupe fastener for easy removal and replacement. In the event of an over-design demand use with exhaustion of the graphite sealant-lubricant from the sintered metal structure to the extent that the propellant gases directly contact the ring seals gas temperatures at the ring seals will be reduced to approximately that of the heavy portions of the device structure by virtue of the heat transfered from the gas into the sintered metal and device structures occurring as the gas filters through and beyond the sintered metal structure. The sealant-lubricant is deposited on the working surfaces of the seal and of the chamber walls, and is subsequently effective as a lubricant and sealant. The seal has, therefore, extended duty life capability with little loss in efficiency for moderate overdesign demand use.

In general, the use of the disclosed seal as herein described would result in better performance of ballistics devices and ordnance weapons by reducing the resistance of the projectile to engraving by the rifling, by providing lubrication and reducing friction and the resulting high temperatures generated in the lands of the rifle bore, by permitting the use of wider lands and deeper grooves and reducing the wear per round fired for longer useful life of the weapon, by providing better sealing of the chamber gases for more efficient utilization of the available propulsive energy resulting in greater kinetic energy of the projectile, greater accuracy and greater ranger for the device or weapon, and by reducing blowby in gas operated reloader mechanisms.

The description of the embodiment of the invention as a static seal given above relates to the anchor of the parent application. Embodiment of the invention as a static seal has wide application. For example, the end of a flanged pipe carrying very high pressure gas at high temperature might be sealed against leakage of the gas by use of a simple circular head and gasket in combination with the impregnated porous member bolted to the flanged end of the pipe. The gasket may be made such that its inside diameter fits the outside diameter of a disc or ring of porous material impregnated with the sealant. Its thickness is somewhat less than the thickness of the porous disc. The diameter of the porous disc is such that a portion of it at its periphery is clamped between the pipe flange and the head together with the gasket. This portion of the porous disc is compressed to the thickness of the gasket as the head is tightened down on the gasket.

The head and gasket alone might prove to be impractical because of difficulty in finding a suitable metal gasket having sufficient ductility to deform and fill the minute voids of the joint and yet have the strength to withstand the force and temperature of the gas acting against it. As temperature and gas pressure vary the parts of the joint change dimension and deflect slightly causing clearances in the joint to vary or develop. Under extremely high gas pressures minute clearances result in considerable gas leakage. Because of the high gas velocities through these clearances erosion occurs and the leak worsens rapidly. With use of the impregnated porous member in the joint the impregnated sealant material is extruded from the pores into the minute clearances initially existing or subsequently developing in the joint sealing the joint against leakage of the gas. Thus a good seal is provided against initially existing or subsequently developing leaks.

The foregoing is considered as illustrative only of the principles of the invention. Further, since numerous modifications and changes will readily occur to those skilled in the art, it is not desired to limit the invention to the exact construstion and operation shown and described, and accordingly all suitable modifications and equivalents may be resorted to.

What is claimed as new is as follows:

1. A seal for providing a barrier to the leakage of a working fluid from a container, comprising in combination a working substance under pressure, a porous structure acted upon by the pressure in said working substance, a viscous sealant material contained in the pores of said porous structure, a plurality of matched nonporous contiguous members and close fitting jointed surfaces therebetween, each of said nonporous contiguous members adapted to be mated respectively with its matching contiguous exact counterpart forming said jointed surfaces therebetween, a joint to be sealed comprising the intersitices between said jointed surfaces, said porous structure interposed between said working substance and said joint interfering therebetween and preventing the direct application of said working substance to said joint, the mated condition of said contiguous members and the interposition of said porous structure between said working substance and said joint continuing throughout the duty life of said seal, and means comprising said working substance forcing said viscous sealant material from the pores of said porous structure substantially into said joint, thereby filling and sealing said joint against leakage of said working substance therefrom.

2. A seal as claimed in claim 1, including the container of said working substance, said container comprising one of said nonporous contiguous members, said viscous sealant material being uniformly under a static fluid pressure head substantially equal to the pressure in said working substance, and said sealant material acting under said fluid pressure head filling and sealing said joint.

3. The seal of claim 2 in which said seal includes a static obturating member and a gasket, one each of said nonporous contiguous member comprising respectively said obturating member and said gasket, and said joint comprising the interstices between the mated surfaces of said gasket, said obturating member, and said container.

4. In a ballistics device a working seal, comprising in combination a cavity and a working surface thereof, said working surface having substantially the same cross sectional configuration throughout its working length, a working substance under high pressure and temperature retained in said cavity by said seal, a porous structure adapted to be mated with said working surface and a high temperature resistant sealant material contained in the pores thereof, a plurality of matched structures collectively comprising both porous and nonporous parts and a matched exact counterpart thereto and close fitting jointed surfaces therebetween, said matched structures all having substantially the same outer peripheral size and all having substantially equally close-fitted matching surfaces with said matched counterpart, the surface of said matched counterpart mating with said plurality of matched structures comprising said working surface, one of said plurality of matched structures comprising said porous structure, another of said plurality of matched structures comprising a nonporous structure adapted to be mated with said working surface and be an exact counterpart to the cross sectional configuration thereof said be a close fit thereto and move with said porous structure in and relatively to said cavity, a sliding surface of said seal comprising the surfaces of said porous and said nonporous structures mating with said working surface, a sliding joint to be sealed comprising the minimal space between said working surface and said sliding surface, said sealant material under high static fluid pressure filling and sealing said joint, the mated condition of said porous and nonporous structures with said working surface continuing throughout the duty life of the seal, and means comprising the pressure in said working substance and temperature thereof acting upon said porous structure extruding said sealant material from the pores thereof and forcing said sealant material under pressure substantially into said joint, thereby sealing off the minimal space between the sliding surface of the seal and the working surface of the cavity to leakage of the working substance therefrom.

5. The working seal of claim 4 in which said seal includes a sealed porous structure comprising in combination said porous structure and said nonporous structure, said sealed porous structure having its exposed surface on the low pressure side thereof sealed against the outflow of said sealant material therefrom, whereby upon application of the heat and pressure of said working substance against its exposed surface on the high pressure side thereof said sealant material is forced into the minimal space between the sliding surface of the sealed porous structure and the working surface of the cavity, thereby sealing the joint between the sliding surface of the seal and the working surface of the cavity against leakage of the working substance therefrom.

6. The working seal of claim 4 in which said nonporous structure comprises an obturating member and a nonporous ring retained thereto, said seal includes an impregnated porous member comprising said porous structure and said sealant material, said ring adapted to be mated with said working surface and be an exact counterpart to the cross sectional configuration thereof and be a close fit thereto and move with said impregnated porous member in said cavity, said impregnated porous member interposed between said ring and said working substance preventing direct application of said working substance to said ring, and attaching means fixing said impregnated porous member to said obturating member, whereby the porous member and said ring are assured of moving together in said interposal relationship with said working substance in said cavity.

7. The working seal of claim 6, including a projectile, and said projectile comprises said obturating member said ring and said impregnated porous member.

8. The working seal of claim 6, and said obturating member having peripheral lands and a groove wherein said ring is retained.

9. The working seal of claim 7, including means comprising said impregnated porous member and said ring supporting said projectile in said cavity and rotating said projectile relatively thereto.

10. The working seal of claim 4, including a sealed impregnated porous member, an obturating member, and a projectile, said sealed impregnated porous member comprising in combination said porous structure, said sealant material, and said nonporous structure, said projectile comprising said obturating member and said sealed impregnated porous member, means comprising said sealed impregnated porous member supporting said projectile in said cavity and rotating said projectile relatively thereto, and the porous structure of said sealed impregnated porous member having its exposed surface on the low pressure side thereof sealed against the outflow of said sealant material therefrom, whereby upon application of the heat and pressure of said working substance against its exposed surface on the high pressure side thereof said sealant material is forced into the minimal space between the sliding surface of the seal and the working surface of the cavity sealing the joint against leakage of the working substance therefrom.

11. The working seal of claim 10 in which said projectile includes a ring, said ring is adapted to be mated with said working surface and be an exact counterpart to the cross sectional configuration thereof, and means comprising said ring and said sealed impregnated porous member supporting the projectile in the cavity and rotating the projectile relatively thereto.

12. A working seal as claimed in claim 4 in which said high temperature resistant sealant material compises in combination a finely divided graphite lubricant, and a fluid vehicle including a substantially noncombustible viscous sealant material, said graphite lubricant dispersed throughout said vehicle, said vehicle and said graphite lubricant existing together under high static fluid pressure in said joint, means comprising the pressure in said working substance and temperature thereof acting upon said porous structure extruding said vehicle from the pores thereof and forcing said vehicle under high static fluid pressure into said joint, and means comprising said vehicle transporting by force feed said graphite lubricant to the working surface of the cavity and into the minimal space between said working surface and said sliding surface, whereby the sliding surface of the seal and the working surface of the cavity are lubricated, and the joint is sealed against leakage of the working substance therefrom.

* * * * *

UNITED STATES PATENT OFFICE
CERTIFICATE OF CORRECTION

Patent No. 3999486           Dated Dec. 28, 1976

Inventor(s) Bernal L. Bower, 2972 Pemba Dr., Costa Mesa, Calif.

It is certified that error appears in the above-identified patent and that said Letters Patent are hereby corrected as shown below:

In Col. 1, line 26, "protesting" should read --protecting--.
In Col. 1, line 44, "membeers" should read --members--.
In Col. 2, lines 40 and 56, and in Col. 4, line 16, "sealand-lubricant" should read --sealant-lubricant--.
In Col. 2, line 52, "interactives" should read --interstices--.
In Col. 2, line 67, "materials" should read --material--.
In Col. 3, line 16, "for" should read --from--.
In Col. 3, line 19, "supperiority" should read --superiority--.
In Col. 3, line 30, "immpregnated" should read --impregnated--.
In Col. 3, line 53, following the words "wear of" insert --metal--.
In Col. 5, line 23, "along" should read --alone--.
In Col. 5, line 54, "bourrelt" should read --bourrelet--.
In Col. 5, line 64, "andd" should read --and--.
In Col. 6, line 13, "tupe" should read --type--.
In Col. 6, line 41, "ranger" should read --range--.
In Col. 7, line 16, "construstion" should read --construction--.
In Col. 7, line 31, "intersitices" should read --interstices--.
In Col. 8, line 14, "said" should read --and--.

Signed and Sealed this

Fifth Day of April 1977

[SEAL]

Attest:

RUTH C. MASON
*Attesting Officer*

C. MARSHALL DANN
*Commissioner of Patents and Trademarks*